(12) United States Patent
Braeken (10) Patent No.: US 7,867,539 B2
(45) Date of Patent: *Jan. 11, 2011

(54) DEVICE FOR THE THERMAL TREATMENT OF UNSHELLED EGGS

(75) Inventor: Hugo Braeken, Hove (BE)

(73) Assignee: Bettcher Industries, Inc., Birmingham, OH (US)

( * ) Notice: Subject to any disclaimer, the term of this patent is extended or adjusted under 35 U.S.C. 154(b) by 575 days.

This patent is subject to a terminal disclaimer.

(21) Appl. No.: 11/874,466

(22) Filed: Oct. 18, 2007

(65) Prior Publication Data

US 2008/0145491 A1    Jun. 19, 2008

Related U.S. Application Data

(63) Continuation of application No. 10/312,720, filed on Sep. 2, 2003, now Pat. No. 7,285,302.

(30) Foreign Application Priority Data

Jul. 2, 2001    (WO) .................... PCT/BE01/00115

(51) Int. Cl.
*A23L 1/01*    (2006.01)
(52) U.S. Cl. ..................... 426/440; 99/355; 99/447; 99/425; 99/339; 99/345; 99/426; 99/448; 99/467
(58) Field of Classification Search ............... 426/614, 426/298, 300; 99/425, 339, 345, 426, 448, 99/467, 440, 355, 447

See application file for complete search history.

(56) References Cited

U.S. PATENT DOCUMENTS 2,733,150 A * 1/1956 Mulvany .................... 426/231

(Continued)

FOREIGN PATENT DOCUMENTS

GB    2146222    4/1985

(Continued)

OTHER PUBLICATIONS

Hou, H., "Pasteurization of Intact Shell Eggs", Food Microbiology, GB, Academic Press Ltd., London, vol. 13, No. 2, 1996, pp. 93-101, XP000910326, ISSN: 0740-0020, p. 94, col. 2, paragraph 3—p. 95, col. 1, paragraph 1.

(Continued)

*Primary Examiner*—Anthony Weier
(74) *Attorney, Agent, or Firm*—Tarolli, Sundheim, Covell & Tummino LLP (57) ABSTRACT

The invention is relating to device for the controlled heating and cooling and conservation of eggs (18) that is provided with an oven space (13) with a carrier plate (7) with holders for the positioning of the eggs (18) substantially upright and a spray device (12) for the cooling of same with a coolant, and which is further provided with a heating element (11) for the generation of steam, whereby means (14) are provided that allow said steam to be subjected to a forced flow whereby this steam flows over the eggs (18) in order to heat the eggs, whereby said carrier plate (7) has openings (16) such that at least part of said steam is guided along the side of the eggs (18) to the underside of the carrier plate (7) so that the underside of the eggs (18) is heated.

21 Claims, 9 Drawing Sheets

U.S. PATENT DOCUMENTS

| | | | |
|---|---|---|---|
| 4,512,250 A * | 4/1985 | Schindler et al. | 99/425 |
| 5,694,836 A * | 12/1997 | Blevins | 99/517 |
| 5,843,505 A * | 12/1998 | Davidson | 426/298 |
| 5,865,142 A * | 2/1999 | Chang | 119/318 |
| 5,939,118 A * | 8/1999 | Cox et al. | 426/298 |
| 6,455,094 B1 * | 9/2002 | Ball et al. | 426/614 |

FOREIGN PATENT DOCUMENTS

| | | |
|---|---|---|
| GB | 2 221 376 | 2/1990 |
| JP | 11046725 | 2/1999 |
| JP | 2001069906 | 3/2001 |
| WO | WO 97/02751 | 1/1997 |
| WO | WO 99/33360 | 7/1999 |

OTHER PUBLICATIONS

Stadelman, W., "Pasteurization of Eggs in the Shell", Poultry Science, US, Champaign, IL, vol. 75, No. 9, 1996, pp. 1122-1125, XP000909253, ISSN: 0032-5791.

Patent Abstracts of Japan, vol. 1999, No. 05, May 31, 1999 (Feb. 23, 1999) & JP 11 046725 A (Q P CORP), Feb. 23, 1999, abstract.

Patent Abstracts of Japan, vol. 011, No. 307 (C-450), Oct. 7, 1987 & JP 62 096066 (Audio Technica Corp; others; 02), May 2, 1987, abstract; figs. 7-9.

Patent Abstracts of Japan, vol. 014, No. 220 (C-0717), May 10, 1990 & JP 02 053461 A (Teruko Takeshita), Feb. 22, 1990, abstract; figs. 5A, 5B, 6, 7, 8, 4B.

* cited by examiner

DEVICE FOR THE THERMAL TREATMENT OF UNSHELLED EGGS

CROSS REFERENCE TO RELATED APPLICATIONS

The present application is a continuation of co-pending application Ser. No. 10/312,720 filed Sep. 2, 2003 entitled "Device and Method for the Thermal Treatment of Unshelled Eggs" which claims priority from and is a 35 USC section 371 filing of PCT international application Ser. No. PCT/BE01/00115 filed Jul. 2, 2001 which is incorporated herein by reference.

FIELD OF THE INVENTION

The invention is relating to a device for the controlled heating and cooling of eggs which is provided with an oven space with a carrier plate with holders for placing the eggs in a more or less vertical position and a spray device for the cooling of the eggs with a coolant and is further provided with a heating element for producing steam. This device makes it possible to pasteurise the eggs or to cause them partially to set in order to obtain what are generally referred to as hard-boiled or soft-boiled eggs.

BACKGROUND AND SUMMARY OF THE INVENTION

The devices known according to the current state of the art for heating and/or cooling eggs have the disadvantage that they do not allow the precise control of the heating or cooling of eggs. It appears that the shape of the temperature curve of the heating and subsequent cooling or quenching of the eggs is critical to the characteristics of the treated eggs.

When eggs are boiled with the aid of the devices known according to the current state of the art, it appears that it is virtually impossible repeatedly to boil soft-boiled eggs in which the white is fully set and the yolk of the egg is not set, and in which the yolk has reached a sufficiently high temperature to destroy any bacteria that it may contain.

Furthermore, according to the state of the art, the shell of boiled eggs has a very variable attachment to the white of the egg. As a result it is a common occurrence when shelling traditionally boiled eggs that part of the set white of the egg is removed together with the eggshell.

It has also been observed that the yolk of an egg boiled according to the state of the art, does not lie in the centre of the egg. During the boiling of the egg, the yolk in fact moves up towards the eggshell so that a boiled egg is obtained in which the white is not uniformly set.

Furthermore the device and the method according to the state of the art do not offer any certainty about the bacterial safety of these soft-boiled eggs.

The invention attempts to remedy these disadvantages by proposing a device and method for heating and cooling eggs that produces virtually perfectly boiled eggs that are easy to shell and which have the yolk located in the centre of the egg. Furthermore the invention makes it possible to obtain eggs with a desired degree of setting of the white and/or the yolk.

The device and the method, according to the invention, also make it possible to pasteurise eggs without causing the white or the yolk to set, whereby the processing characteristics of the egg are markedly improved compared to those of unpasteurised eggs.

To this end means are provided that permit aforesaid steam to be subjected to a forced flow, whereby this steam flows over the carrier plate from a first extremity to the opposing second extremity of same so that the upper side of the eggs are heated, whereby said carrier plate is provided with openings so that at least a part of said steam is guided along the side of the eggs to the underside of the carrier plate.

According to the invention the device is purposely fitted with a preferably removable oven plate mounted between the carrier plate and the bottom of the oven space so that a free space is created between the latter and the oven plate.

According to the invention aforementioned spray device comprises in an advantageous way at least one sprayer that allows aforementioned coolant to be sprayed as a cylindrical jet of coolant with an annular section.

Said sprayer has in a particularly advantageous fashion a cone-shaped hole that opens into a spray opening whereby said liquid is squirted via a canal adjacent to the circumference of this opening so that this liquid rotates in the opening and is thus guided into the oven space via aforesaid spray opening.

In a specific embodiment said spray opening has a diameter of 1 to 2.5 mm and this is by preference substantially equal to 2 mm.

Said spray device has liquid lines that connect said sprayer to the source of the liquid, whereby the length of these lines is substantially the same for all sprayers.

According to a preferred embodiment of the device, according to the invention, this is provided with a preferably removable liquid reserve comprising two compartments, where a first compartment has at least one valve that admits liquid to said spray device and/or the heating element, and where a second compartment is provided with at least one inlet opening so that liquid can flow from the oven space into this second compartment.

According to the method according to the invention for heating or cooling eggs so that they set at a predetermined point or for pasteurising them, the eggs, which may be at differing initial temperatures, are placed next to one another on a carrier plate placed in an oven space, whereby the latter is preheated in accordance with a predetermined temperature curve by means of steam to a temperature of between substantially 95° C. and 110° C. and by preference to 98° C. The eggs are then cooled with the aid of a coolant for a period of 10 to 50 seconds, by preference from 15 to 30 seconds, before the eggs have reached such a high temperature in their cores that bacteria are destroyed. After cooling, the eggs are maintained in the oven space at a temperature that lies below the setting temperature of the yolk while the core temperature of the eggs rises further as a result of heat transmission from the surrounding white to a temperature at which bacteria are destroyed.

According to a preferred embodiment of the method, according to the invention, to obtain eggs of which only the white is set, the oven space is heated by means of steam for 6.2 to 6.8 minutes whereby, when the core of the eggs has reached a temperature of between 45° and 50° C., the oven space is subsequently cooled to a temperature of between 55° C. and 65° C. and by preference to about 60° C.

Other particularities and advantages of the invention will be apparent from the description given below of an embodiment of the method and the device, according to the invention; this description is given merely by way of example and does not in any way limit the scope of the claimed protection; the reference numbers used below refer to the attached figures.

The same reference numbers in the various figures relate to the same or similar elements in the various figures.

Figure 1:
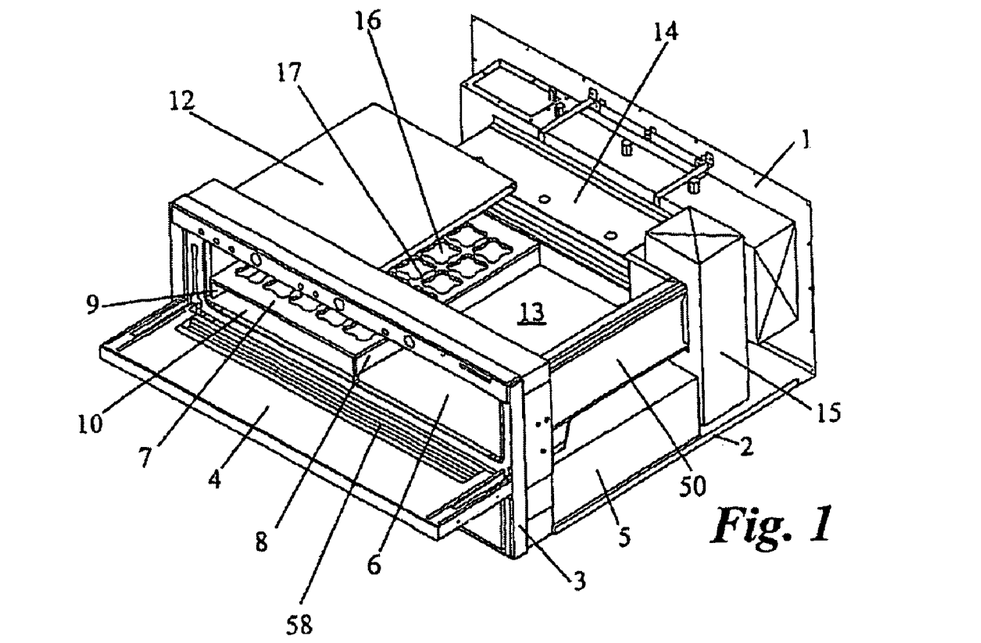
FIG. 1 is a schematic perspective drawing of a first embodiment of the device according to the invention whereby certain parts have been left out.
Figure 2:
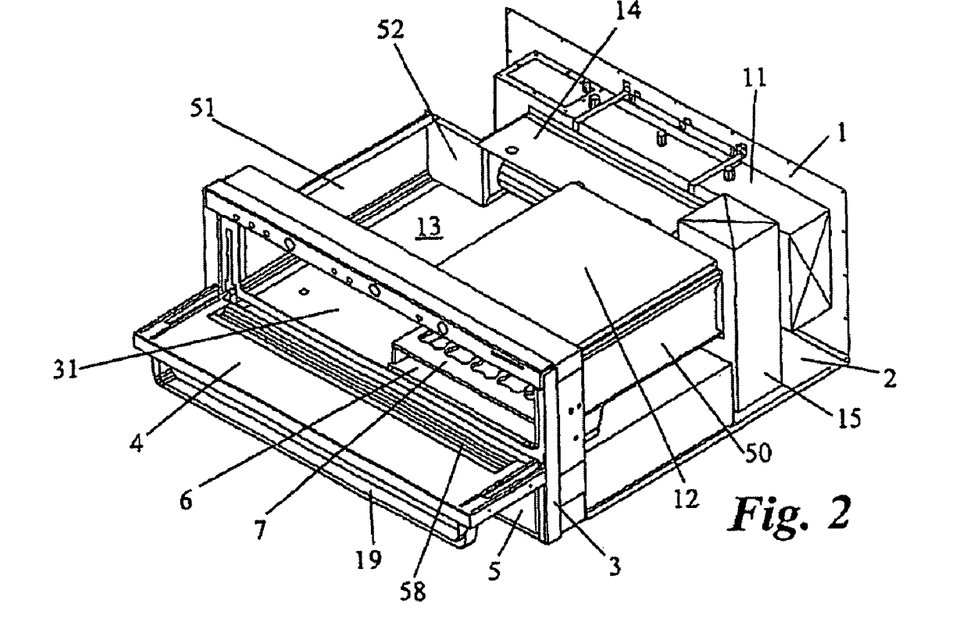
FIG. 2 is a schematic perspective drawing of this first embodiment of the device according to the invention whereby other parts have been left out.

The device according to the invention, as represented in FIGS. 1 and 2, shows two sidewalls located opposite each other, which are not represented in the figures and which join to back wall 1 and a plate 2 that constitutes the bottom plate of the device. The upper side of the device consists of a plate which, for the clarity of the figures, is likewise not shown. A rectangular frame 3 is provided on the front of the device on which a swing-down closing door 4 is installed in order to shut the device. A water reservoir 5 that can be removed from the device so that it can be emptied or filled is provided below this door 4.

In addition the device is provided with an oven plate 6 which more or less extends between the sidewalls of the device and on which a carrier plate 7 rests for the positioning of the eggs, which are not shown in FIGS. 1 and 2. This carrier plate 7 stands by means of two parallel extended vertical ribs 8 and 9 that are perpendicular to the frame 3 on said oven plate 6 such that a free space 10 is formed between the latter and the carrier plate 7.

Above the oven plate 6 and under the plate which forms the upper side of the device a so-called spray plate 12 extends which is connected via a pump 46 to a water reservoir 5. In this way an oven space 13 is formed under the spray plate 12 in which said carrier plate 7 and the oven plate 6 are located.

The oven space 13 is bounded on the underside by a bottom plate of which the edges connect to the vertical sides of the oven 50, 51 and 52. These oven walls 50, 51, and 52 connect on their upper side to aforementioned spray plate 12.

On the front side the oven wall is formed by aforesaid closing door 4.

On the rear wall 1 a heating element 11 is provided that consists of an electrical boiler for the generation of steam. The heating element 11 is connected to a ventilator 14 which is located between this heating element 11 and the oven plate 6 in order to blow steam into the oven space 13 above the carrier plate 7.

Next to the heating plate 11 and the oven space 13 an electronic control unit 15 is also provided for the device.

The carrier plate 7 is provided with square openings 16 with rounded corners that constitute holders for the vertical positioning of eggs. To this end these openings 16 are provided with projections 17 that lie in the plane of carrier plate 7. When an egg is positioned in such a holder the egg will thus partly project under the carrier plate 7, whereby it bears on said projections 17 in such a way that the opening 16 is not entirely filled with the corresponding egg. In the embodiments of the carrier plate shown in the figures each opening 16 is provided with four such projections 17.

Figure 3:
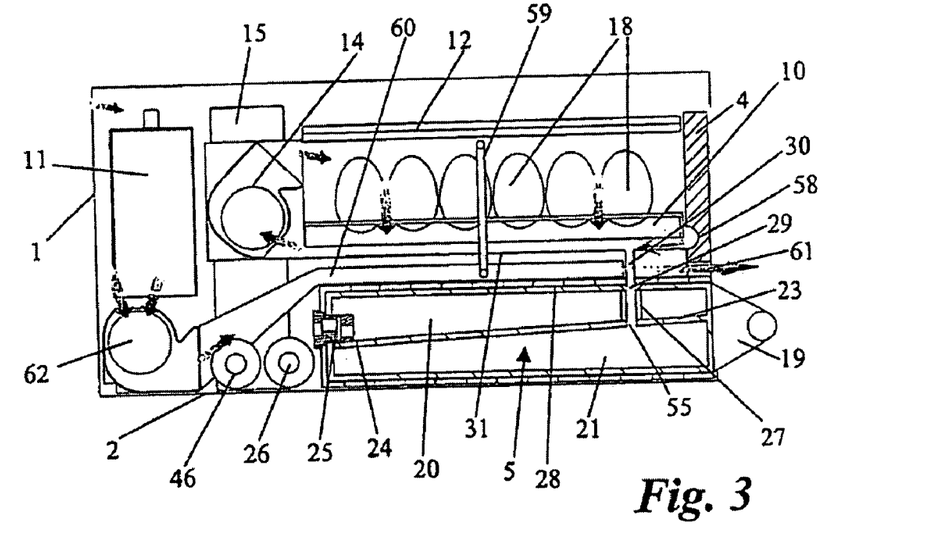
FIG. 3 is a schematic longitudinal section along the plane III-III shown in FIG. 1 of the device according to the invention.

In the longitudinal section of the device according to the invention shown in FIG. 3, eggs 18 are shown that are positioned more or less upright. That is to say the eggs 18 rest with their most rounded ends on the carrier plate 6 against the projections 17. Furthermore this figure shows the closing door 4 in a vertical position so that it shuts said oven space 13.

The closing door 4 is provided with an opening 58 level with the oven plate 6. This opening 58 is semi-cylindrical in shape and extends over the entire width of the oven plate 6 in such a way that steam in the space below the carrier plate 7 and above the bottom plate 6 can flow via this opening 58 over the underside of the oven space to fan 14 and which can return this steam back over the eggs.

Said fan 14 is by preference of the elongated type and extends over virtually the entire width of oven space 13. The presence of said opening 58 in the closing door 4 which thus works in conjunction with fan 14 means that the steam is evenly distributed over the eggs placed in the device independently of the number of eggs located in the oven space 13.

When the carrier plate 7 is not entirely filled with eggs, a uniform heating of the eggs is thus nonetheless obtained.

Furthermore a removal duct 59 is provided that connects the oven space 13 with an exhaust pipe 60. This exhaust pipe 60 leads via one extremity to an opening 61 under the closing door 4. The other end of the exhaust pipe 60 works in conjunction with a fan 62 that draws in air from the surroundings so that this ambient air is mixed with the steam in the exhaust pipe 60. In this way there is no danger that a person standing in front of opening 61 might be burnt by the extracted steam.

As is apparent from this figure the water reservoir 5 has an oblong shape and is provided with a handle 19 that allows the water reservoir to be removed from the device in a simple way.

The water reservoir 5 has two compartments 20 and 21 separated from one another by a bulkhead 22. This bulkhead 22 extends between the sides of the water reservoir 5 and is inclined, where the higher end 23 is located on the side of the handle 19, while the lower end 24 is located against the side wall opposite this handle 19. In this way liquid in the upper compartment 20 will always flow to the lower part 24.

Furthermore a valve 25 is provided in the side wall of compartment 20 near said lower part 24 of the bulkhead 22. This valve works in conjunction with a water pipe not shown in the figures that is connected to a heating element 11 via a pump 26. In this way this valve 25 ensures that water from the upper compartment 20 can flow to the heating element 11 with the aid of the pump 26.

The lower compartment 21 has two inlet openings 55 that connect to two tubular connecting pieces 27 that extend through said upper compartment 20 to an opening 29 provided in the upper surface 28 of water reservoir 5.

Further there is a tubular drain channel 30 provided that extends from the bottom plate 31 of the oven space 13 to aforesaid opening 20 in the upper surface 28 of water reservoir 5. In this way water on the bottom plate 31 can flow via the drain channel 30 and the connector piece 27 to said lower compartment 21.

In order to allow this lower compartment 21 to drain in a simple fashion when it is removed from the device, said connector pieces 27 are located near to the two opposing edges of the upper surface 28. It is thus possible to allow the liquid to flow from this compartment 21 along a first connector piece 27 when the water reservoir 5 is placed vertically on one side, while air is sucked in in compartment 21 via the second connector piece 27.

To fill the upper compartment 20 with water the upper surface 28 is provided with at least one opening not shown in the figures.

Figure 4:
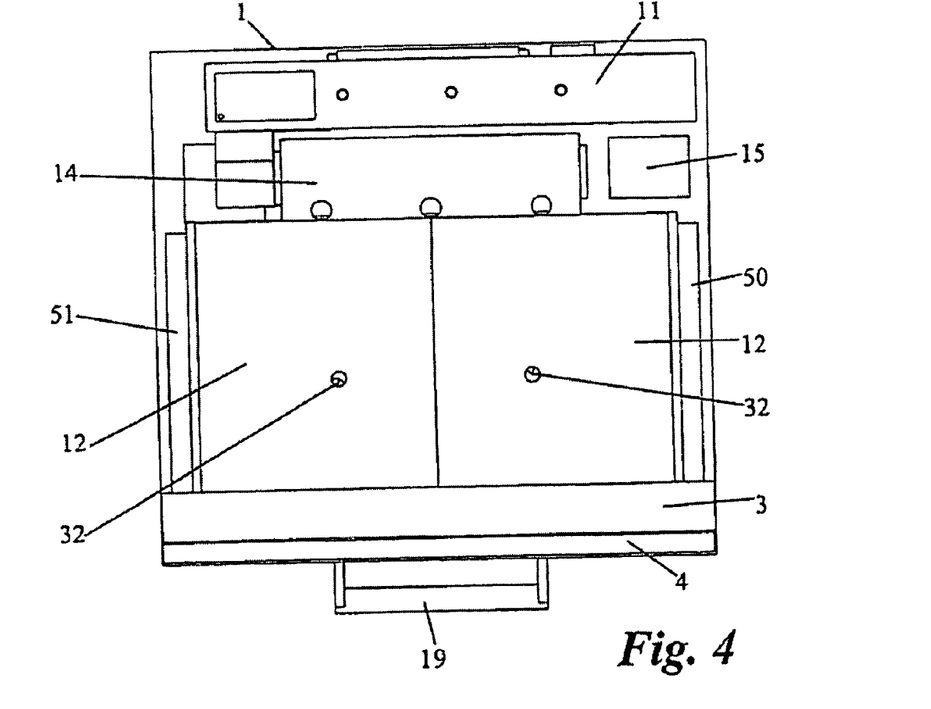
FIG. 4 is a schematic plan view of the device according to the invention.

FIG. 4 shows a schematic plan view of the device according to the invention. As can be clearly seen in this figure two spray plates 12 are provided next to one another which each have a connection opening 32 for a water line not shown in the figures.

Each of the spray plates 12 are formed by three plates installed one above the other, 33, 34 and 35.

Figure 6:
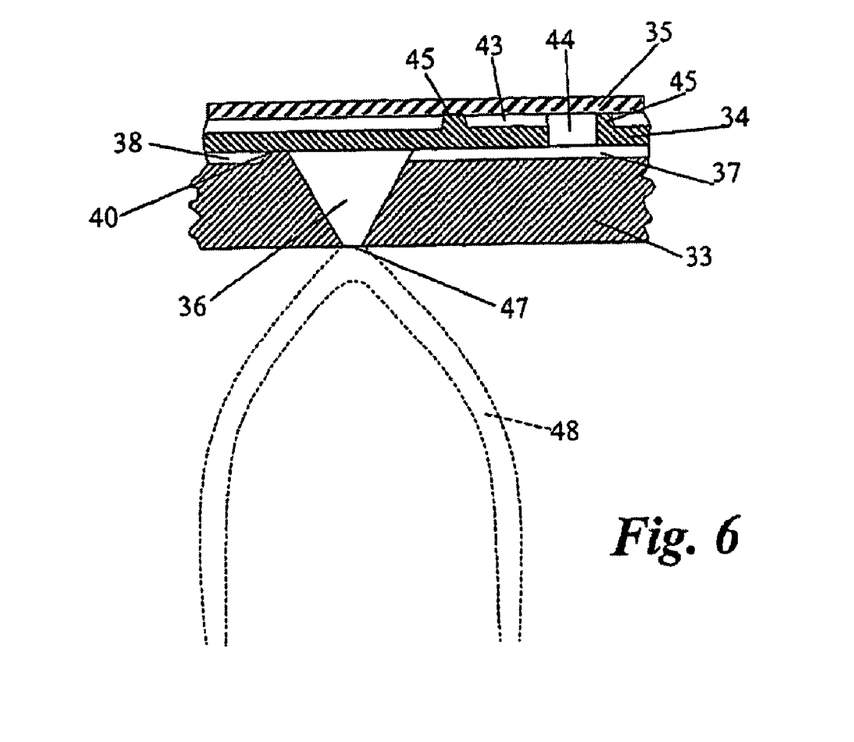
FIG. 6 is a schematic cross-section of a part of a spray plate with a sprayer.

A first plate 33 forms the upper side of the oven space and consists by preference of a hard plastic that can withstand temperatures of up to 110° C. In this plate 33 conical sprayers 36 and liquid channels have been milled out. FIG. 6 schematically shows a section of such a sprayer 36 with a channel 37. The sprayer 36 opens at its smallest diameter via a spray opening 47 into the oven space 13 and is positioned in such a way that it is located almost centrally above a corresponding opening 16 in carrier plate 6. The spray opening 47 has by preference a diameter between 1 and 2.5 mm, and is usually virtually equal to 2 mm.

Furthermore the liquid channel 37 connects tangentially to the largest diameter of the sprayer 36 so that a liquid, flowing under sufficiently high pressure from channel 37 into the sprayer 36 undergoes a rotational motion.

In order to limit the transfer of heat from the oven space 13 through the spray plate 12, the material of the plate 33 is partly milled away in the vicinity of the channels 37 so that recesses 38 are obtained in countersunk relief separated by strengthening ribs 39. In this way the plate 33 has upstanding strengthening ribs 39 and channel walls 40.

Figure 5:
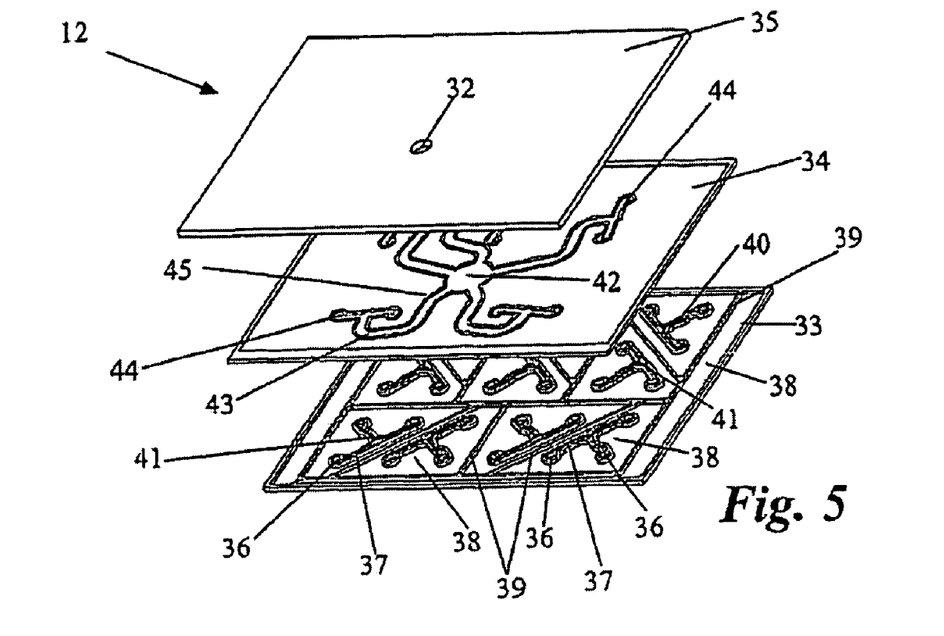
FIG. 5 is a schematic perspective view of the constituent parts of a spray plate of the device according to the invention.

This first plate 33, represented in FIG. 5, is provided with several sprayers 36 that are connected via a distribution chamber 41 to an equally long liquid channel 37.

A second plate 34 is mounted against this first plate 33 in which a central cylindrical distribution space 42 is milled. Multiple liquid channels 43 of equal length depart from this latter space 42 and issue in drill holes that extend perpendicularly through plate 34. Each drill hole 44 operates in conjunction with a corresponding distribution space 41 of the first plate 33 in such a way that liquid brought into the distribution space 42 via liquid channels 43 and drill holes 44 can flow to the distribution spaces 41 and ultimately reach the sprayers 36 via the liquid channels 37.

Each distribution chamber 41 is made cylindrical so that the liquid entering them via the drill holes 44 is subjected to a rotational motion. As a result of this rotational motion of the liquid there is a virtually uniform pressure on the walls of the distribution chamber 41 and in this way the same rate of flow arises in the liquid channels 37 that issue into the distribution chamber on the circumference of same.

Furthermore material is also milled away in this second plate 34 such that the walls 45 of the liquid channels 43 are raised in comparison with this plate 34.

A third plate 35 is mounted against the second plate 34 such that the channels 43 of this second plate are closed off on their upper side by means of plate 35. Said connection opening is provided in this third plate 35 which in consequence is located virtually centrally above the distribution space 42.

In this way liquid that reaches the cylindrical distribution space via connection opening 32 is entirely distributed in the latter, so that the same liquid flow rate is pushed through each of the channels 43.

The connection opening 32 is connected via a water line not shown in the figures to valve 25 of said upper compartment 20 of water reservoir 5. In this way water can be pumped with the aid of a pump 46 provided for this purpose from this upper compartment to the sprayers 36. This pump 46 is by preference realised in such a way that this water is sent to the sprayers at a pressure of 0.3 to 0.5 bar.

As the length of the water line and the channels 37 and 43 is equally long for each sprayer 36 a virtually identical jet of water 48 is obtained at each spray hole 47 at virtually the same moment in time.

This liquid jet 48 has as schematically shown in FIG. 6 an annular section, whereby the jet 48 changes from a conical form to a cylindrical form as the distance from the spray hole 47 becomes greater. In this way according to the invention a spray jet with an annular section is by means of a spray device, which comprises spray plate 12 with sprayers 36, obtained above each opening 16 in the carrier plate 7.

The control unit 15 of the device according to the invention works in conjunction with a temperature meter that measures the temperature in the oven space 13, such as for example a thermocouple. Furthermore this control unit also works in conjunction with a time counter and with said spray device and this controls the admission of steam to the oven space 13.

Figure 7:
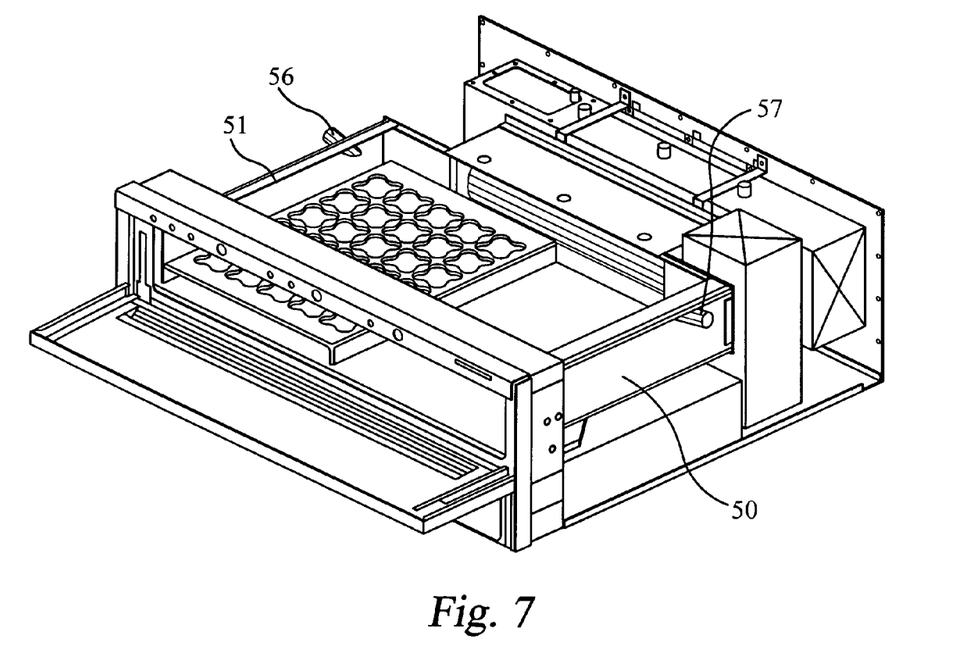
FIG. 7 is a schematic perspective drawing of a second embodiment of the device according to the invention, whereby certain parts have been left out.

The embodiment of the device according to the invention as illustrated in FIG. 7 shows a spray device that is different from the embodiment of the device described here above.

In this way the embodiment of the device shown in FIG. 7 shows two sprayers 56 and 57 located in two opposing sidewalls 50 and 51 of the oven space 13. Each of these sprayers 56 and 57 allow the entire oven space to be sprayed with liquid from reservoir 5. In order to spray all eggs 18 to the same extent during the cooling, these sprayers 56 and 57 are by preference installed in such a way that they spray liquid into the oven space 13 in turns.

It is of course possible to provide more than two sprayers in the device. For an embodiment of the device according to the invention in which large numbers of eggs can be placed, it may be necessary to install several sprayers in order to cool all the eggs in accordance with the same temperature curve.

In an advantageous embodiment of the device according to the invention it is furthermore provided with a vibratory source that ensures that the liquid that is present in the oven space 13 or in the boiler 11 is evaporated or atomised. This vibratory source is by preference made of a piezo-electrical material such that ultrasonic vibration with a frequency of between 1 and 3 MHZ can be achieved. Vibration of this kind permits water to be evaporated to a large extent at relatively low temperatures, such as room temperature. For example when heating the liquid in the boiler 11 this is subjected to vibration during a period of 3 minutes at a temperature of 25° to 30° C.

In this way a relatively high level of humidity of at least 50% to virtually 100% is achieved in the oven space 13. This evaporated water condenses on the eggs that are located in the oven space 13 and moistens them. In this way it is ensured that the heat absorption of the eggs is considerably improved and made uniform when these eggs are subsequently heated with steam.

Furthermore said vibratory source ensures that the eggs 18 are vibrated at a frequency of between 1 and 3 MHZ. This vibrating causes the yolk of the eggs 18 to rise so that it is substantially in the centre of the eggs.

It is a matter of fact that eggs are usually stored standing vertically, whereby the most rounded end and the air chamber of the egg points upwards. It appears that the egg yolk in eggs kept in such a way rises so that it is virtually next to this air chamber. When such eggs are placed in the device for the preparation of soft-boiled or hard-boiled eggs this takes place by preference by placing them vertically in the device whereby they rest with their most rounded end and the air chamber on said carrier plate.

By subjecting the eggs to vibration by means of said vibratory source for a period of more or less 2.5 to 3.5 minutes, and preferably for 3 minutes, during the heating of the eggs, the yolk rises so that it lies centrally in the eggs in the so-called natural position.

The length of time during which the eggs are vibrated depends on the temperature curve in the oven space 13 and is experimentally determined for each type of egg and then programmed with the aid of the control unit 15.

When the yolk has reached this position, the yolk has set to such an extent by reason of the heating of the oven space that the yolk takes up a fixed position vis a vis the white of the egg.

In an interesting embodiment of the device according to the invention it is furthermore provided with an electromagnetic source of radiation to heat the eggs. This electromagnetic source of radiation produces in particular so-called microwaves, which are generally known.

This radiation source is by preference used in combination with said heating element 11, which produces steam, in order to prevent the eggs from bursting by the application of excessively high power to the radiation source.

When, however, the eggs are only heated with the aid of said radiation source, the radiation source required for heating 60 "medium" eggs with a total weight of between 3.18 kg to 3.78 kg from 5° C. to 58° C. has a power of 1.2 kW. When power of this magnitude is applied the eggs reach a temperature of 58° C. after roughly 8 minutes. Of course this is likewise possible for eggs in other weight classes. This embodiment is highly interesting for the pasteurisation of eggs.

In order to determine what power is required to heat the eggs, a temperature meter is provided in the oven space that for example consists of an infra-red sensor that measures the temperature curve of a randomly selected egg in the oven space for a particular period of time. This temperature curve is for example measured for a period of 2 minutes.

The device described above makes it possible to apply the method according to the invention for the boiling of eggs.

Pursuant to this method uncooked eggs in their shells 18 are placed in the oven space 13. These eggs 18 are positioned vertically in the openings 16 in the carrier plate 17. That is to say the most rounded end 49 of the eggs protrudes to some extent below the carrier plate 7. Subsequently the closing door 4 is closed so that the oven space is virtually entirely sealed off from the surroundings.

In a following step the oven space 13 is heated with steam from the heating element 11 to a temperature between 95° and 110° C. Good results are obtained when the oven space 13 is heated to a temperature of more or less 98° C. After a period of time of 6 to 7 minutes the eggs are cooled using the said spray plate by water at room temperature during 10 to 50 seconds, in particular during 15 to 30 seconds and the oven space 13 is then maintained at a temperature of between 50° C. and 65° C.

When the oven space 13 is thus maintained at this consumption temperature of between 50° C. and 65° it is possible to keep the eggs a long time without further setting of the yolk or the white occurring. This makes it possible among other things to use the device or the method according to the invention in self-service counters so that consumers can always be sure of having a virtually perfect soft-boiled egg and the certainty that harmful bacteria in the egg have been destroyed.

When heating the eggs the outer layer of the egg is first heated, while the heating of the core of the eggs takes much longer by reason of the relatively slow diffusion of heat in the egg. As a result it is important that the eggs 18 are cooled before they have reached the desired temperature in their centre as it has been determined that after the cooling of the eggs and the oven space there will be a further rise of the core temperature as a result of the continued diffusion of the heat still in the egg.

When the eggs are cooled too late, the continued diffusion of heat in the eggs will cause the entire egg to set after a certain period of time.

The temperature ultimately desired in the core of the eggs is thus dependent on the extent to which the eggs are to set.

In order to avoid possible bacterial infection in eggs care must be taken to ensure that the temperature reached in the core is sufficiently high to ensure that all bacteria possibly present in the egg are destroyed. The temperature required is known and for a period of heating of 2 to 3 minutes is virtually equal to 60° C.

Figure 8:
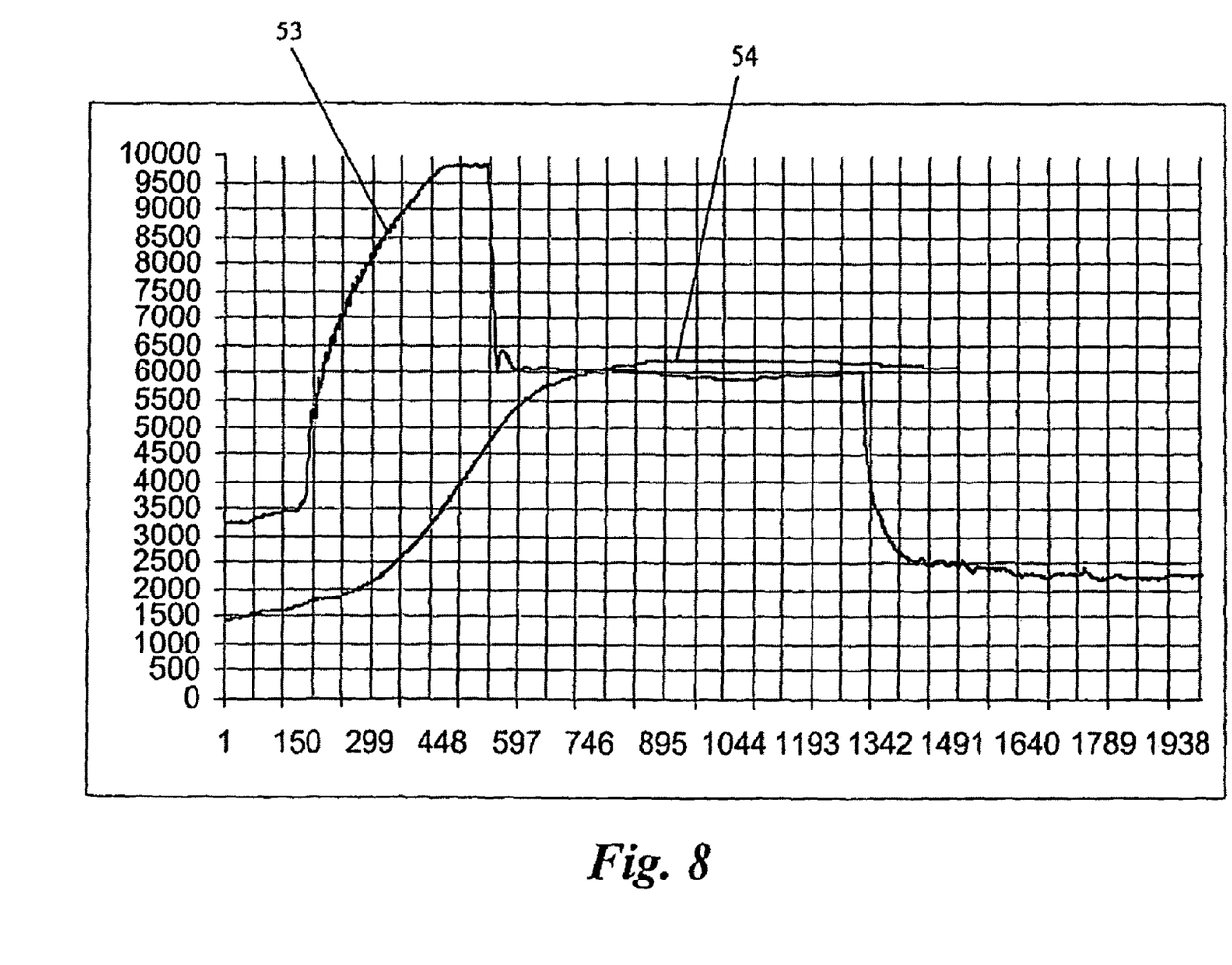
FIG. 8 is a graph that shows the temperature of the oven space and the core of the eggs as a function of time.

In FIG. 8 two curves are shown which show the course of the temperature as a function of time for the preparation of soft-boiled eggs in which only the egg white has set. A first curve 53 shows the course of the temperature in the oven space 13, while a second curve 54 shows the course of the temperature measured in the core of the eggs.

In this way the oven space is heated for about 6.5 minutes with steam from a temperature of 35° C. to 97° C. During this heating of the oven space the core temperature of the eggs rises from about 15° C. to about 48° C. When the eggs are sprayed with a coolant, namely water at room temperature, for 20 seconds the core temperature of the eggs continues to rise to about 62°, while the temperature in the oven space is maintained at a virtually constant 60° C. When said closing door 4 is opened, the temperature in the oven space 13 falls almost immediately to room temperature, which is about 23° C.

However it is also possible to maintain the temperature of the oven space 13 at more or less 60° C. without there being any further setting of the eggs.

By using the device and the procedure according to the invention it is for example possible to boil a number of eggs in the oven space so that they are hard-boiled, while the remaining eggs are soft-boiled. To achieve this the eggs that are to be hard-boiled are cooled for a shorter period of time than the eggs which are to be soft-boiled.

Furthermore soft-boiled eggs can after being for example cooled outside the device to a temperature between 2° C. and 22° C. be again placed in the device and be again heated and cooled perhaps together with raw eggs in accordance with the method according to the invention so that these eggs are once again brought to consumption temperature.

The invention furthermore also concerns a method for the pasteurisation of unshelled eggs. Pursuant to this method the eggs are heated until the core, in particular the centre of the yolk, has reached a temperature of between 53° C. and 65° C., and preferably between 57° C. and 61° C., and maintained at this temperature during a sufficiently long period of time for the bacteria present in the eggs to be destroyed. The temperature required for destroying bacteria, such as for example salmonella, is sufficiently known. American patent documents U.S. Pat. No. 5,843,505 and 6,004,603 give in both their FIG. 1 a chart that illustrates the relationship between temperature and the period of time during which this temperature must be maintained in order to destroy bacteria.

In order to achieve a sufficiently high temperature in the eggs as quickly as possible, the eggs are by preference warmed simultaneously by steam and microwave radiation. It has in fact been determined that when microwaves are used the yolk of the eggs is heated more quickly than the white of the egg.

Furthermore it appears that the appearance of the white, namely its colour among other things, changes when it is maintained for a certain period of time to the pasteurisation temperature of between 53° C. and 65° C. Consequently it is important after heating up the eggs, to cool them as quickly as possible to a temperature below 45° C. The eggs are thus cooled for example to a temperature between 5° and 25° C.

By cooling in this way the desired temperature of the eggs is reached within 15 to 120 seconds thus avoiding the occurrence of this colour change in the white of the egg.

The eggs are cooled by preference by irrigating them or spraying them with water at a temperature of between 5° C. and 25° C.

When the eggs are cooled down after the core has been exposed for virtually 3.5 minutes to a pasteurisation temperature of 60° C., it appears that the appearance of the egg white and the yolk of the eggs can hardly be distinguished from that of unpasteurised eggs.

In another example the core of the eggs, namely the centre of the yolk, is maintained at a temperature of 57° C. and the eggs are then cooled. Here too it was determined that as a consequence of the cooling of the eggs there was virtually no change in the white or the yolk of the eggs.

It is thus in this way possible pursuant to this procedure to pasteurise eggs very quickly without causing significant changes in the properties of same. By heating eggs which are at room temperature using both microwave radiation and steam the eggs can be fully pasteurised in less than 30 minutes when a pasteurisation temperature of 60° in the core of the eggs is applied.

Figure 12:
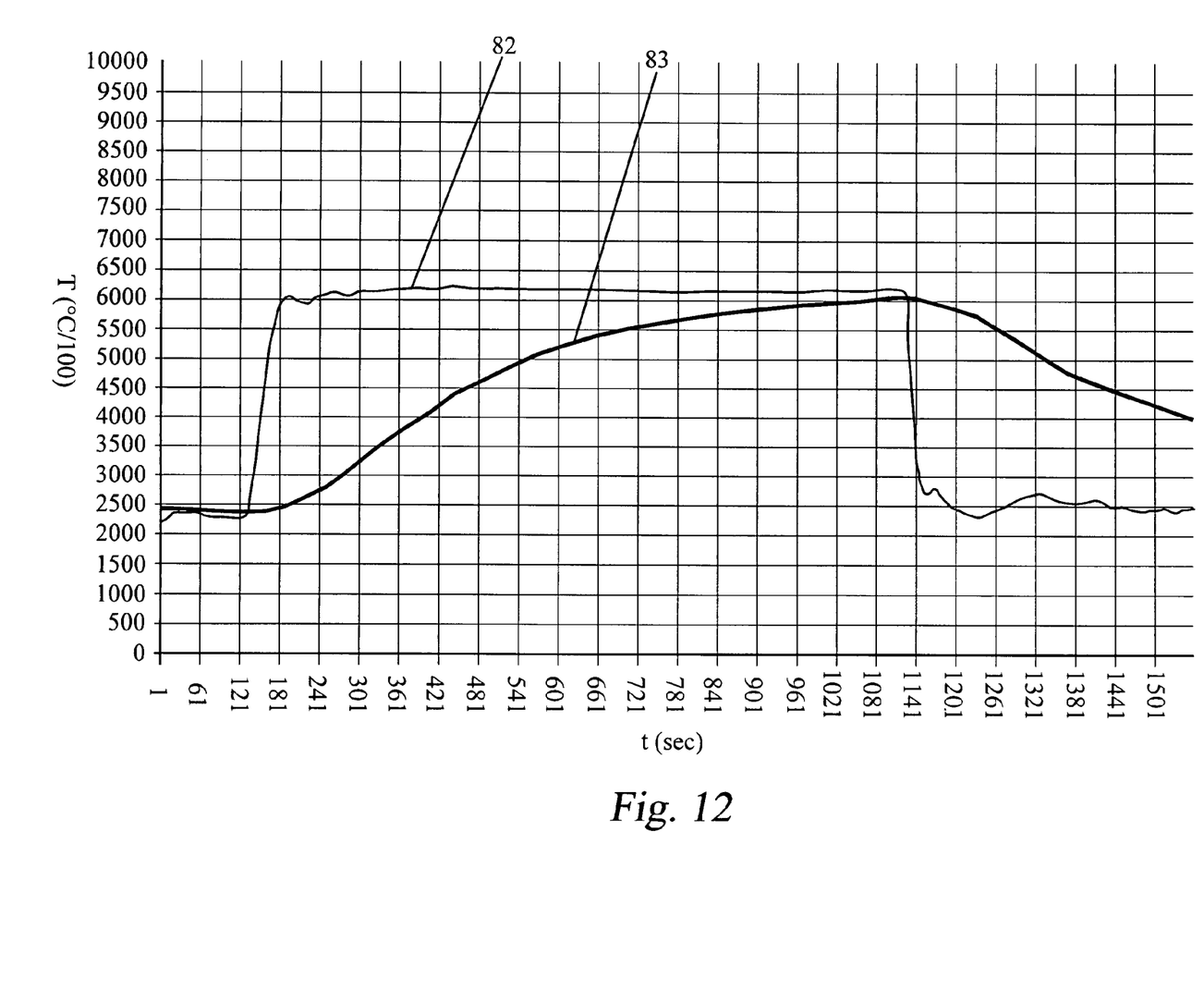
FIG. 12 is a graph that shows the course of the temperature of the eggs and the oven space during pasteurisation as a function of time.

The temperature curve for another example of egg pasteurisation is given in the graph of FIG. 12. This figure shows two curves. The first curve 82 shows the temperature evolution in the oven space while the second curve 83 represents the temperature evolution in the core of the eggs. In this example, the oven space that contains the eggs has been heated with steam from substantially 23° C. to 61° C. in 60 seconds, whereby subsequently, the temperature in the oven space has been maintained during ca. 940 seconds at a temperature of about 62.5° C., and, finally, the oven space was cooled for about 40 seconds to about 25° C. by spraying the eggs with water. During this process the temperature at the core of the eggs is between 59° C. and 61° C. for about 4 minutes.

In the case of such rapid heating of the oven space, and therefore also of the eggs, pasteurised eggs are obtained, whereby the egg white near the shell has already more or less set while the egg white around the yolk is still transparent. The contents of such a rapidly pasteurised egg is slightly more viscous than a non-pasteurised fresh egg but it can however be used without any problem for processed food stuffs, such as for preparing fried or scrambled eggs.

The eggs are moistened in an advantageous fashion before heating with the help of water vapour at a relatively low temperature formed by the ultrasonic vibration of the water in said heating element. In this way the heat transfer between the eggs and the steam is considerably improved.

The dimensions of the device according to the invention as represented in the figures are chosen such that it can be installed in a kitchen in the same way as a conventional oven. By adjusting the dimensions and shape of the device according to the invention, it can be made suitable for handling only a few eggs or a very large number of eggs.

Furthermore the upper compartment of the water reservoir can be replaced by a connection to a conventional water supply, while the lower compartment can be replaced by a drain pipe leading to a connection to the drains.

Figure 9:
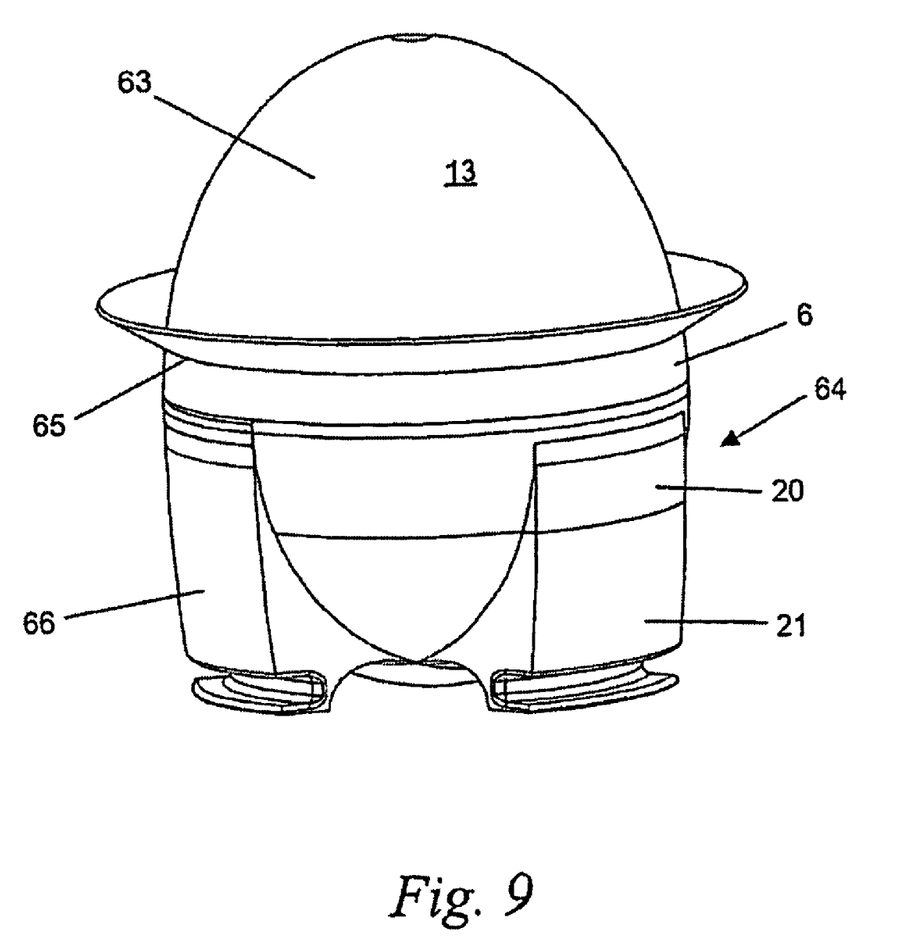
FIG. 9 is a schematic perspective drawing of a third embodiment of the device according to the invention.
Figure 10:
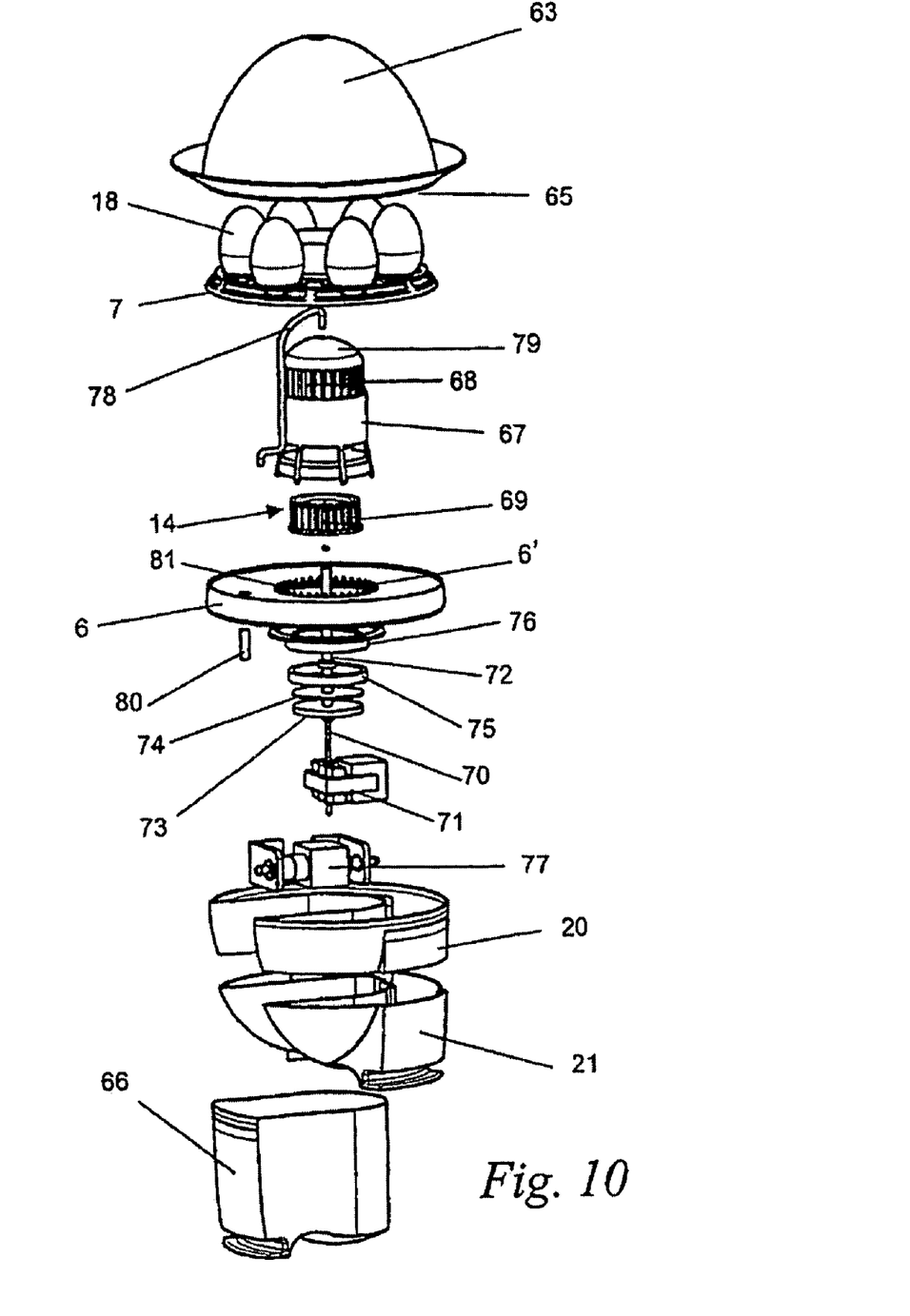
FIG. 10 is a schematic perspective drawing of the disassembled parts of the device illustrated in FIG. 9.

A third embodiment of the device, according to the invention, is shown in FIGS. 9 and 10. This device has a protective cover 63 which can be removed from a housing 64. The protective cover 63 is in the shape of a semi-ellipsoid and its circle-shaped edge 65 fits onto the housing 64. This protective cover 63 surrounds an oven space 13 which is closed at the bottom by a ring-shaped oven plate 6 which has a central circle-shaped opening 6'.

Besides this oven plate 6, the housing 64 also comprises a first compartment 66 which contains an electronic control unit for the device and a water reservoir that consists of two separate compartments 20 and 21. The latter two compartments 20 and 21 are U-shaped such that they partly surround the aforementioned first compartment 66.

Figure 11:
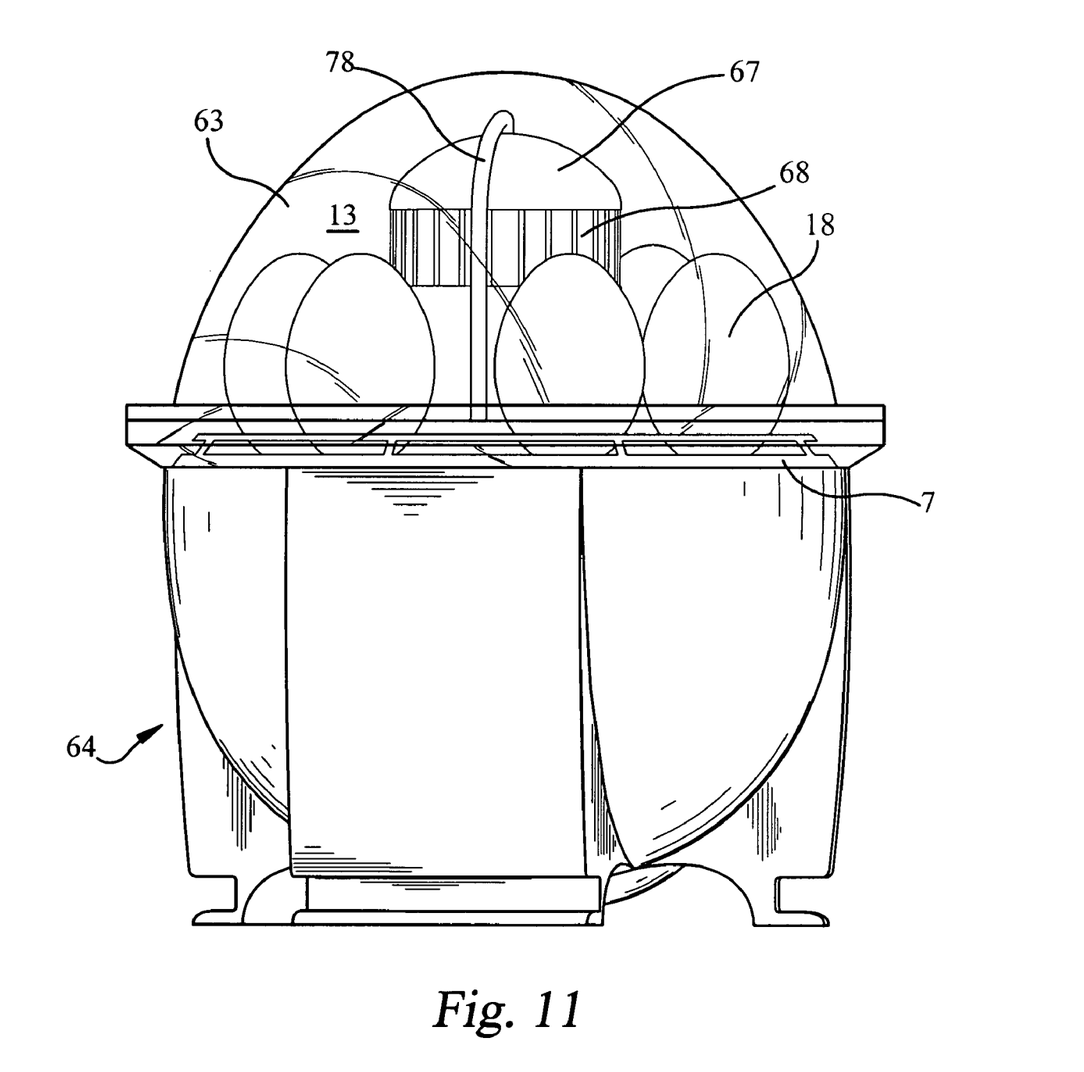
FIG. 11 is a schematic side-view of the same device as in FIGS. 9 and 10 which presents a transparent protective cover.

On the aforementioned oven plate 6 rests a ring-shaped carrier plate 7 which has holes in order to hold the eggs 18 upright on this carrier plate 7 in the oven space 13 as shown in FIGS. 10 and 11. This carrier plate 7 is made preferably from a wired structure in order to ensure adequate circulation of steam around the eggs 18.

The device further is provided with a ventilator 14, in a co-axial position with the aforementioned oven plate 6 and the carrier plate 7, which extends above the circle-shaped opening 6'. This ventilator 14 has short blades 69 which run practically parallel to its shaft. In addition, the ventilator 14 has a ventilator housing 67 that separates the ventilator 14 on the sides and at the top from the oven space 13 and that has openings 68 along its entire circumference at the height of the ventilator 14, in order to let the steam flow over the eggs 18.

The ventilator 14 is driven via its shaft 70 by means of an electrical motor 71 which is mounted in the aforementioned first compartment 66.

The shaft 70 of the ventilator 14 is partly situated in a cylindrical co-axial sleeve 72 with respectively on top of each other a layer of thermal insulation 73, a cooking plate 74 surrounded by a sealing ring 75 and a connecting piece 76.

The boiling plate 74 comprises a heating resistor so that water on the plate can be heated to produce steam. In this respect, the connecting piece 76 is connected to the boiling plate 74 so that a cylindrical boiling vessel is produced. The steam that is produced by means of the boiling plate 74 leaves the boiling vessel via the aforementioned opening 6' in the oven plate 6 and as such the steam is extracted by the ventilator 14 that distributes the steam via the aforementioned openings 68 of the ventilator housing 67 over the eggs 18.

Further, a pump 77 is mounted in the compartment 66 of the housing 64 that works in conjunction with the bottom compartment 21 of said reservoir in order to distribute the water from this compartment 21 via a water pipe 78 over the eggs 18.

The water pipe 78 leads, in particular, to the centre and above the ventilator 69 via an opening 84 which is provided in the spherical top side 79 of the ventilator compartment 67. When the ventilator 69 is working, the water that comes out of the water pipe 78 is attracted by the ventilator and squirted through the openings 68 of the ventilator housing 67 and the water is spread over the eggs 18.

This makes it possible to moisten the eggs 18 before they are subject to thermal treatment or to cool the eggs rapidly when the thermal treatment has finished. By varying the rotation speed of the ventilator 14, the speed of the squirted water varies and the water is distributed over the eggs 18 substantially evenly and over substantially the entire oven space 13.

In order to regulate the temperature of the steam in the oven space 13, the said oven plate 6 has a temperature sensor 80 that co-operates with the said electrical control unit and that measures the temperature of the oven space 13.

The water that is thus transferred from the bottom compartment 21 into the oven space 13 ends up on the oven plate 6 which has a conical surface so that the water flows to the said central opening 6' and to the said boiling plate 74.

The connecting piece 76 that connects to said opening 6' also has a so-called overflow, which is not shown in the figures, which evacuates the water when the latter exceeds a pre-set level in the said boiling vessel to the top compartment 21.

Furthermore, the oven plate 6 along the inside of the said opening 6' has a series of upright teeth 81 at a small distance from each other. In the case of an egg 18 breaking, these teeth 81 prevent egg white or yolk or even egg shell from going through the said opening 6' with the water. Since any egg white or yolk that is deposited on the oven plate 6 will set immediately, this can then be stopped by the said teeth 81.

So in order to boil eggs hard or soft or to pasteurise them, the protective cover 63 is removed from the housing 64 and the eggs 18 are placed on the said carrier plate 7 in the oven space 13. Subsequently, the protective cover 63 is placed back on the housing 64 in order to close the oven space 13.

The bottom compartment 21 of the reservoir is filled with water and placed in the housing 64. This water is then used during the cooking of the eggs 18, to generate steam by means of the boiling plate 74 on the one band, and on the other hand as cooling water to cool the eggs 18 rapidly after they have been heated by the steam.

By means of a control panel which is not shown in the figures, it is possible to select the desired thermal treatment for the eggs.

Notwithstanding that in the aforementioned embodiment of the device, according to the invention, the water pipe 78 constitutes a simple spraying device, it is however possible to provide a different spraying device.

It is possible, for example, that each egg 18 is irrigated with water by means of individual sprays. It is also possible to squirt water against the inner walls of the protective cover 63 from the oven plate 6, whereby the inner wall above the eggs 18 is uneven so that water would be guided onto the eggs 18 from these uneven parts.

The water pipe 78 in an alternative version of this embodiment of the device could be co-axial with the said ventilator shaft 70 and, for example, coincide with said shaft 72.

It is clear that although the parts in the aforementioned version of the device mainly have an axial symmetry, the device can be executed in a variety of geometrical shapes.

During the pasteurising or the preparing of eggs, the oven space 13 is heated with only part of the power that is available for the heating of the oven space. For example, this means that only 80% of the available power is used to heat the oven space from about 35° C. to 50° C. For this process, the time necessary to reach the 50° C. in the oven space is measured. From this data, which is a measure for the thermal heat capacity, the amount of power that is necessary in the other part of the pasteurising process in order to obtain the desired temperature curve, is calculated.

In this description steam is understood as every form of water in the gas phase. This may be both water vapour resulting from the boiling of water in said heating element or water that has been atomised in the oven space using said vibratory source.

Furthermore aforementioned coolant and the liquid that is heated in the heating element is by preference water.

The invention is of course not limited to the embodiment described here above of the device and the method according to the invention, for example the carrier plate for the eggs may take various forms and this may for example have a wire structure so that the steam can flow freely over the entire surface of the eggs. Furthermore the oven space may be heated in other ways, or this may be heated both by means of steam and by means of electrical resistances.

Notwithstanding the fact that the device according to the invention is highly suited to using water as coolant, it is not impossible that other coolants or cooling gases could be used.

The invention claimed is:

1. Apparatus for the controlled heating and cooling of eggs (18) in their shells comprising an oven (13) having a carrier for positioning of the eggs (18) and a spray device (12,78) for the cooling of said eggs with a cooling liquid, a heating element (11) for the generation of steam, a ventilator which forces the steam to flow over the eggs (18), said carrier (7) having openings (16) for positioning eggs on the carrier_such that at least part of the said steam passes through the openings and is guided over the eggs (18) so that the latter are heated over practically an entire surface.

2. A device for the controlled heating and cooling of eggs (18) in their shells comprising:
   an oven including a carrier for positioning the eggs (18) within the oven;
   a spray device (12,78) for the cooling of the eggs with a cooling liquid;
   a heating element (11) that generates steam;
   a ventilator (14) which subjects said steam to a forced flow over the eggs (18),
   wherein said carrier has openings for supporting eggs such that at least part of the said steam is guided through the openings over the eggs to heat a surface of the eggs.

3. The device according to claim 2 wherein said ventilator (14) causes steam to flow into the oven space (13) above the eggs to flow through said openings in the carrier past said eggs.

4. The device according to claim 2 wherein said spraying device (78) cooperates with said ventilator (14) in such a way that said cooling liquid is substantially evenly distributed over said eggs (18).

5. The device according to claim 2 wherein the carrier comprises a carrier plate and openings in the carrier plate are generally rectangular with projections extending inwardly from sides of said openings allowing steam to flow through corners of the openings.

6. The device according to claim 3 wherein said ventilator (14) has a top side onto which a sprayer (78) of said spraying device debouches in such a way that the rotation of the ventilator causes the cooling liquid to be distributed over the eggs (18).

7. The device according to claim 2 wherein said spray device (12) comprises at least one sprayer (36) that permits the spraying of said cooling liquid in a cylindrical jet of liquid (48) with an annular section.

8. The device according to claim 7 wherein said sprayer (36) has a cone shaped opening that issues in a spray hole (47), whereby said liquid is squirted via a channel (37) touching the circumference of this opening so that this liquid rotates in the opening and is thus guided via said spray hole (47) into the oven space (13).

9. The device according to claim 8 wherein said spray hole (47) has a diameter of 1 mm to 2.5 mm.

10. The device according to claim 7 wherein said spray device (12) has a sprayer for each holder (17) of the carrier plate (7) so that the eggs (18) placed in the holders can be sprayed individually.

11. The device according to claim 7 wherein said sprayers (36) are located in a flat plate (33) in which liquid channels (37) are formed by removal of material from this plate.

12. The device according to claim 2 wherein said spray device contains sprays located in two opposing walls of the oven space (13).

13. The device according to claim 2 wherein said spray device (12) comprises liquid channels (37, 43) which connects spray (36) to a source of liquid (5), whereby the length of these channels is virtually the same for all sprayers (36).

14. The device according to claim 2 wherein said carrier is a wire structure with the openings defined by the wire structure.

15. The device according to claim 2 additionally comprising an electromagnetic source of radiation for heating the eggs (18) in the oven space (13).

16. The device according to claim 2 wherein a liquid reservoir is provided having two compartments (5), whereby a first compartment (20) has at least one valve (25) that allows liquid to be supplied to said spray device (12) and/or heating element (11), whereby a second compartment (21) is provided with at least one inlet opening (55) so that liquid from the oven space (13) can flow into this second compartment (21).

17. The device according to claim 16 wherein said first compartment (20) has an inclined bulkhead (22) such that liquid in this compartment (20) flows to said valve (25).

18. The device according to claim 17, characterized in that said first compartment (20) is located above said second compartment (21) whereby the bulkhead (22) forms the separation between both compartments.

19. The device according to claim 16, characterized in that said inlet opening (55) works in conjuction with a tubular connection piece (27) that extends between the inlet opening (55) and the upper surface (28) of the liquid reservoir.

20. The device according to claim 2, characterized in that it is equipped with an atomizer that allows cooling liquid to be atomized in said free space in order to cool the oven space (13).

21. The device according to claim 2 further comprising a control device (15) that works in conjunction with a temperature measuring instrument that measures the temperature in the oven space (13) and governs the supply of steam to the oven space (13) as a function of the measured temperature whereby the control device (15) works further in conjunction with a time counter in order to activate said spray device (12) at a predetermined moment for a predetermined period of time.

* * * * *